March 15, 1932. A. MARSAN 1,849,547
AIRPLANE
Original Filed Oct. 9, 1929
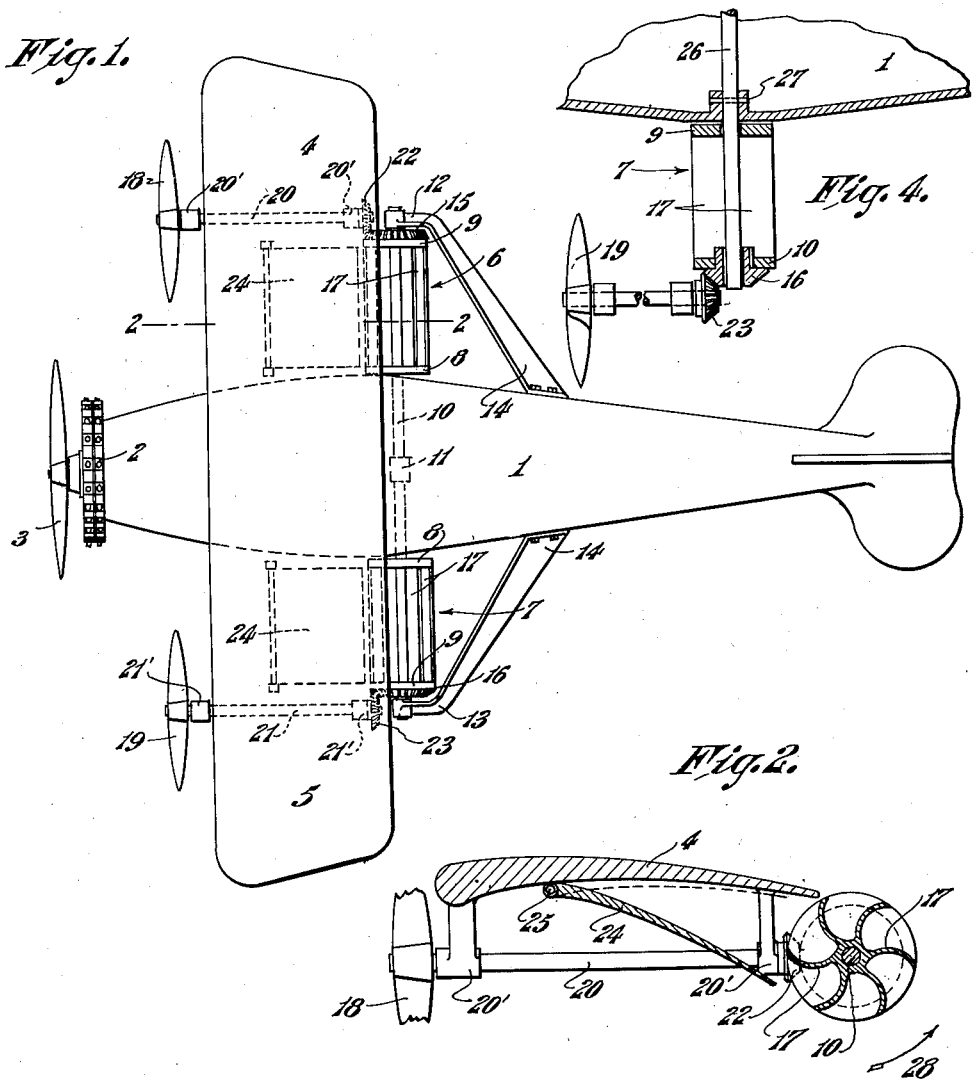
INVENTOR.
Adelard Marsan,
BY
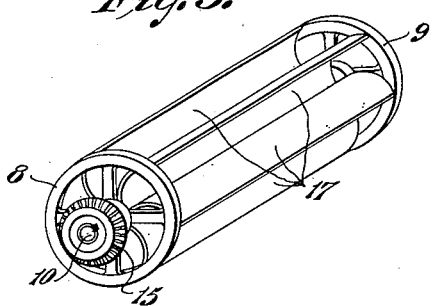
ATTORNEY.

Patented Mar. 15, 1932                                                          1,849,547

UNITED STATES PATENT OFFICE

ADÉLARD MARSAN, OF BONDSVILLE, MASSACHUSETTS

AIRPLANE

Application filed October 9, 1929, Serial No. 398,394. Renewed December 3, 1931.

This invention relates to improvements in attachments for heavier than air machines, sometimes called airplanes or aeroplanes.

An object of the invention is to provide an attachment for the purpose of overcoming the dangerous effects of tail spins and nose dives, which often result in the loss of life and property.

A further object is to provide a stabilizer for the airplane for the purpose of retaining it on an even keel, should the stoppage of the engine for any reason occur.

Broadly, my invention comprises the installations of auxiliary motors which are operated by the pressure of air due to the motion of the airplane. These are located, preferably, on the opposite sides of the fuselage and may be directly connected together by shafting, or other means, so that they operate as a unit. If desired, they may be so mounted for independent operation, as will be described.

Geared, or otherwise operatively connected to these auxiliary air operated motors are propeller blades which are preferably located at the forward edge of the wings. In flight, the main propeller, which is operated by the engine, drives the airplane or pulls it thru the air. This motion of the airplane will operate the auxiliary air motors, which in turn drive the auxiliary propeller blades. The air motors in general each comprises a cylindrical framework consisting of rings. Secured to these rings are curved blades, or in other words, in the auxiliary air motors, there is an open framework permitting the air pressure to turn the motors and to pass freely thru between the blades when the same are rotated. In the event the main propeller ceases to operate, due to engine, or other trouble, the motion of the airplane will cause the auxiliary motors to drive the auxiliary propellers, thus creating a stabilizing effect on the entire machine, also enabling the airplane to effect a safe landing, without serious results, either on a sharp incline or on a gradual descent to the ground.

This open framework device consists of concave blades, that are set at equal intervals or angles around a circle all of which blades face in the same direction around the circle and so mounted on an opened cylindrical framework, as to be capable of rotating about its axis. When in a current of air (or other fluid), the blades begin to rotate on account of the air pressure against the concave blades on one side being greater than the resistance met by the blades diametrically opposite, whatever the velocity this rotary motion creates power which may be utilized.

Optional means may be provided for screening or shutting off the currents of air to the auxiliary motors during its ascent. This screen is designed for movement into a position close to the bottom or inside of a wing or wings, when not in use, and movable downward in order to shut off the current of air, when the airplane is rising, or during any other movement.

Referring to the drawings:

Fig. 1 is a top plan view showing the auxiliary motors located and attached to the opposite sides of the fuselage and at the rear edges of the wings and geared to the auxiliary propellers.

Fig. 2 is a sectional view on the line 2 of Fig. 1 on an enlarged scale showing one wing, the screen and auxiliary motor in section.

Fig. 3 is a detail perspective view of one of the open frame auxiliary air motors removed from the airplane.

Fig. 4 is a modification of the supporting means of the air motors.

Referring to the drawings in detail:

1 designates the fuselage, as a whole, 2 the main motor which operates the propeller blade 3. The two wings are indicated at 4 and 5. Secured on opposite sides of the fuselage 1 are the auxiliary air motors 6 and 7. These motors are constructed with the two end rings 8 and 9 to which the shaft 10 is connected, which shaft, as shown, is a continuous member. It passes thru the bearing 11 on the fuselage and is supported, as shown in this construction, at its outer ends in the brackets. The two motors, 6 and 7, will therefore operate as a unit. The ends of the shaft 10 which are supported in the brackets 12 and 13 are secured to the opposite sides of the fuselage at 14. Secured to the shaft 10 at its outer ends are the bevelled gears 15 and 16. Secured to and located between each of the end rings 8 and 9 are a series of curved blades 17. The rings 8 and 9 are connected together by means of the curved blades 17. It will be noticed that these blades are concavo-convex with the curves facing in the directions as clearly shown in Fig. 2.

The auxiliary air motors, as shown, comprise open structures which permit the currents of air to pass freely thru between the blades and thus rotate the motors. 18 and 19 are two auxiliary propellers, which are located at the forward edges of the wings. These propellers are secured to the shafts 20 and 21 on the ends of which are the bevelled gears 22 and 23 which mesh with the bevelled gears 15 and 16. The shafts 20 and 21 are supported in bearings 20' and 21' on the wings 4 and 5.

Referring to Fig. 2, it will be observed that the upper edges of the auxiliary air motors are located adjacent to the upper rear edges of the wings, whereby the currents of air under the wings will strike the curved blades of these motors and cause them to rotate and operate the auxiliary propellers, when the airplane is in motion, or when the main motors cease to operate and the machine is falling in a nose dive or tail spin, or, moving in any direction.

24 designates a screen member which may be employed and which is located on the lower side of the wings 4 and 5 and pivoted thereto, as indicated at 25.

The object of this screen is to shut off the flow of air to the auxiliary motors during the starting or rising movements of the airplane.

The operation of the auxiliary motors may be stated as follows:

During flight, the currents of air under the wings which are caused by the motion of the airplane, will rotate the two auxiliary motors 6 and 7, and, thru the shaft 10 and the bevelled gears 15, 16, 22 and 23 and shafts 20 and 21, the auxiliary blades 18 and 19 will be rotated, thus assisting in the propulsion of the airplane.

In the event that the main propeller blades 3 cease to operate, the descent of the airplane, either gradually or on a steep incline, will rotate the auxiliary propellers 18 and 19 through their connection with the open cylinders 6 and 7; effecting a stabilization of the airplane: thus preventing a nose dive or tail spin with the result the machine is enabled to descend without serious results, and on an even keel. The open cylinders 6 and 7 also assist in getting the airplane under way, or started from the ground.

Referring to the construction shown in Fig. 4, 26 designates a shaft that is fixedly secured to the fuselage by any suitable means as bolts or screws 27. The rings 9 and 10 are mounted to turn freely on the shaft 26. This shaft is understood to be rigid enough for mounting the open cylinders 6 and 7, without employing the brackets 12 and 13, shown in Fig. 1. The gears 15 and 16 are preferably secured to the rings 10. Any suitable gear ratio of course may be employed to effect a proper rate of revolution of the propeller blades 18 and 19.

In order to support the cylindrical propeller blade on a high speed aeroplane, the length of cylindrical blades 17 may be constructed shorter, while in a slower speed aeroplane or heavy planes a longer cylindrical blade 17 may be required.

It is to be understood that I do not limit myself to the use of the auxiliary cylindrical propellers 6 and 7, as shown in connection with an airplane, as the same construction may be employed for air motors that are detached from an airplane for operating an electric generator or other machine. It is also to be understood that these cylindrical motors may be employed for utilizing the power developed by the rising and falling of the tides and the power transmitted by means of suitable connections to any piece of machinery that it is desired to operate. They may be employed in any angle or in a vertical or horizontal position, as their open construction and the shape of the blades will permit either air or water to flow freely thru and contact with the blades and in either direction.

From this description, it will be seen that I have provided a simple and efficient means for stabilizing an airplane. I do not limit myself to the use of two auxiliary motors, as several may be employed.

Any suitable gear ratio may be utilized between the air motors 6 and 7 and the auxiliary propellers 18 and 19 in order to obtain the correct propelling effect.

The gears 15 and 16 may, if desired, be located at either end of the auxiliary motors.

These auxiliary motors may be attached to dirigibles, as well as to heavier than air machines. These motors will operate whatever the direction of the wind or tides. When properly adjusted, the undertow current can be used effectively. These motors can also be used in straight river current. These motors may be used in connection with air funnels to concentrate the wind upon the blades.

The location of the curvature of the blades 17 is such that should a tail spin occur the air would pocket in the curvature and cause the auxiliary cylinders 6 and 7 to rotate in the direction, shown by the arrow 28. The exact location of the auxiliary air motors may, of course, be varied from that shown in the drawings as for example, they may be spaced a greater distance from the rear edges of the wings than that shown, in order to afford a clear vision for the operator of the machine.

What I claim is:

An airplane of the monoplane type, comprising, in combination, a fuselage, a supporting wing, a main propeller and motor therefor, supplemental motors comprising open cylindrical members having curved blades located at the rear of the wing, a rotatable shaft extending transversely through the fuselage and to which shaft the said motors are secured, gears secured to the said motors, propeller blades located at the forward edge of the wing and means for operating the propellers from the supplemental cylindrical motors, when the airplane is driven through the air.

In testimony whereof, I have hereunto signed my name at Springfield, in the county of Hampden and State of Massachusetts, this 5th day of October, 1929.

ADÉLARD MARSAN.